United States Patent

Furukawa et al.

[11] Patent Number: 6,075,219
[45] Date of Patent: Jun. 13, 2000

[54] ELECTRODE UNIT FOR RESISTANCE WELDING

[75] Inventors: Shigeki Furukawa; Hisashi Higuchi; Tsuyoshi Koike, all of Yokkaichi, Japan

[73] Assignee: Sumitomo Wiring Systems, Ltd., Yokkaichi, Japan

[21] Appl. No.: 08/893,158

[22] Filed: Jul. 15, 1997

[30] Foreign Application Priority Data

Aug. 7, 1996 [JP] Japan .................................. 8-208479

[51] Int. Cl.[7] .................................................. B23K 11/30
[52] U.S. Cl. ........................................ 219/119; 219/86.33
[58] Field of Search ............................ 219/86.25, 86.31, 219/86.33, 86.7, 86.8, 119, 120

[56] References Cited

U.S. PATENT DOCUMENTS

| | | |
|---|---|---|
| 3,036,199 | 5/1962 | Page . |
| 4,473,734 | 9/1984 | Henry ..................................... 219/86.8 |
| 4,500,768 | 2/1985 | Rossell . |
| 4,504,724 | 3/1985 | Szantho et al. . |
| 4,924,055 | 5/1990 | Nakahigasi et al. ............. 219/86.33 X |

FOREIGN PATENT DOCUMENTS

| | | |
|---|---|---|
| 0259591 | 3/1988 | European Pat. Off. . |
| 1395907 | 3/1965 | France . |
| 3822150 | 1/1990 | Germany . |
| 4107984 | 9/1992 | Germany ............................... 219/86.8 |
| 59-66985 | 4/1984 | Japan . |
| 59-67891 | 5/1984 | Japan . |
| 61-104505 | 5/1986 | Japan . |
| 07065927 | 3/1995 | Japan . |
| 1577917 | 10/1980 | United Kingdom ................ 219/86.33 |

OTHER PUBLICATIONS

A European Search Report and Annex, Nov. 17, 1997.
A Japanese Patent Abstract with JP No. 07–065927, Oct. 3, 1995.

*Primary Examiner*—Gregory Mills
*Attorney, Agent, or Firm*—Greenblum & Bernstein, P.L.C.

[57] ABSTRACT

In order to carry out quick and easy changeover of platens of an electrode unit, a shank holder connects a fixed lower electrode with a platen. Further, a movable upper electrode is connected with another platen by the shank, which is held by the shank holder. The shank holder and the shank are integrally connected with each other, and are positioned in such a manner that the electrodes can perform resistance welding. Merely detaching the shank and shank holder from their respective platens allows the desired electrode units to be mounted on, or removed from, a resistance welder without making any position adjustments of the electrodes. Consequently, adjustment of the positions of the electrodes becomes unnecessary, thereby facilitating quicker and easier changeover of electrodes.

21 Claims, 4 Drawing Sheets

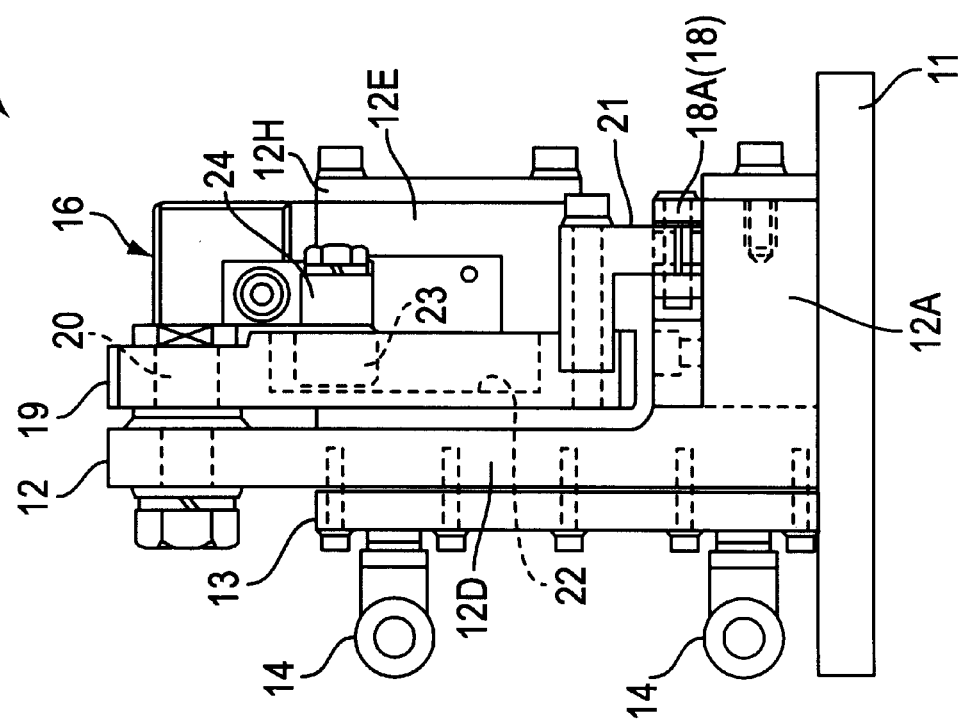
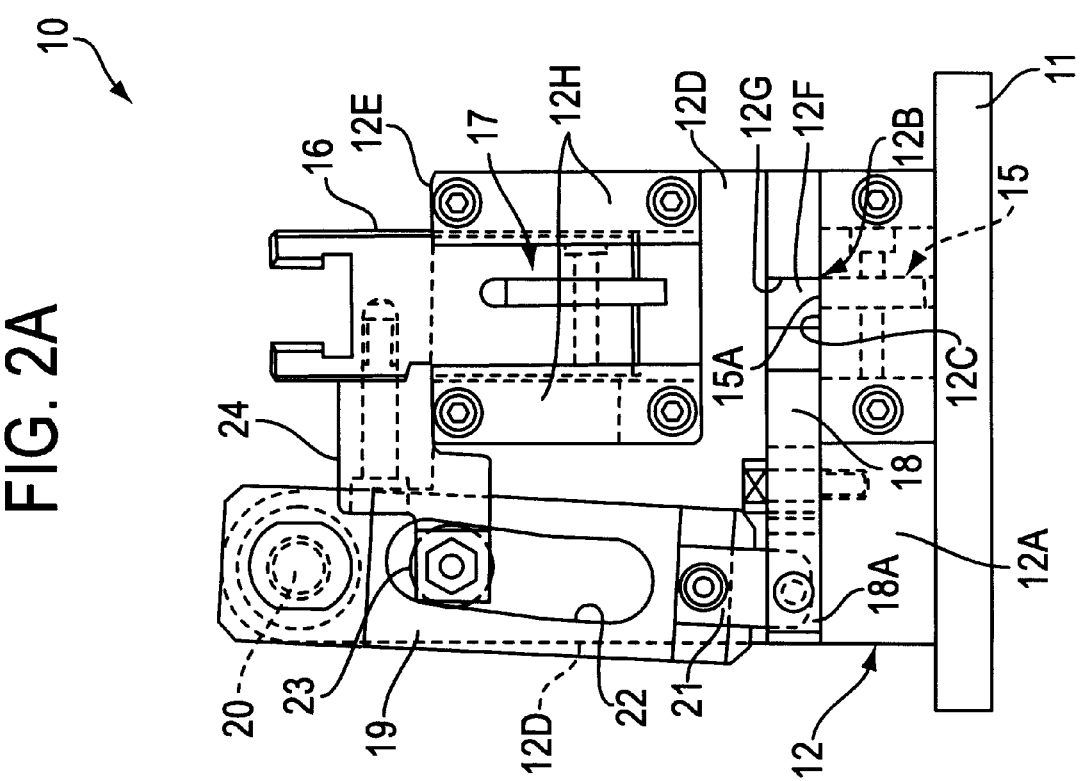

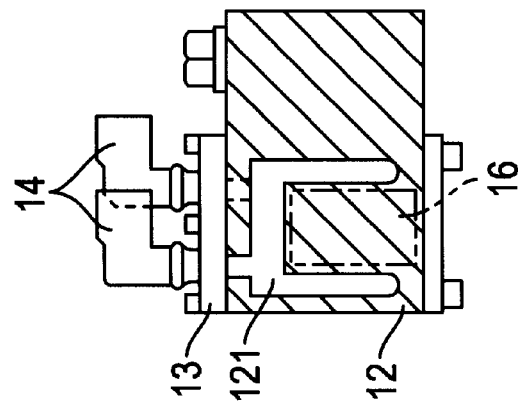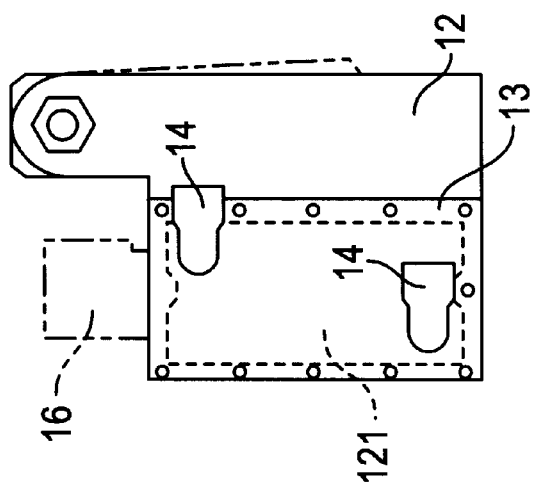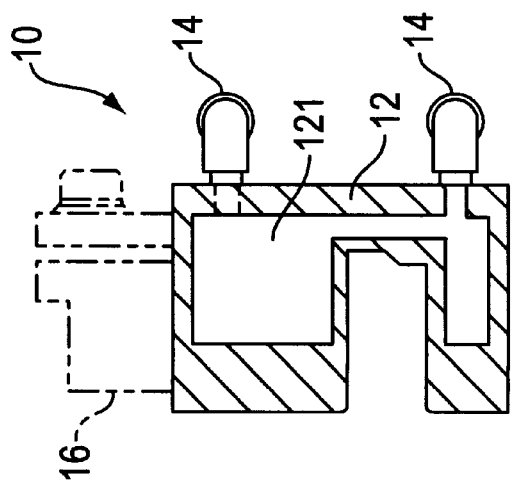

ELECTRODE UNIT FOR RESISTANCE WELDING

BACKGROUND OF THE INVENTION

1. Field of the Invention

The present invention relates to an electrode unit for resistance welding.

2. Description of Background Information

The welding of a plurality of wires by use of a resistance welder is known and disclosed, for instance, in Japanese Unexamined Patent Application No. HEI 7-65927. In general, such a welding apparatus has a pair of platens that are positioned facing one another in a fastening-separating relationship. On one platen, a guiding member with a bottom and sides is provided, the bottom of which is integral with a fixed electrode that is electrically connected to the platen. On the other platen, a movable electrode is provided for applying voltage to a work positioned between the fixed electrode and the movable electrode. With this structure, resistance welding is carried out by nipping a work which is positioned between the surrounding guide members, the fixed electrode and the movable electrode, with substantial voltage being applied between the electrodes.

In the above-noted welder, each electrode is individually loaded on a platen, so that it is extremely difficult to accurately position the center of each electrode, when electrodes are changed according to the different types of work to be welded. Especially with wire harnesses, where integrated joint welding with many wires bundled, and then connected in a batch manner, is to be carried out, a considerable period of time is needed for initial start-up, due to frequent changing of electrodes. In addition, if the positioning of the electrodes is incorrect, there exists the possibility of failure and consequent damage to the electrodes and the like, because of interference between the movable electrode and the edge of the surrounding members.

The present invention was made in view of the above-mentioned problems, and with the object of providing an electrode unit for resistance welding capable of carrying out easy and fast exchange of platens.

SUMMARY OF THE INVENTION

In order to solve the above-noted problem, the present invention is related to an electrode unit for resistance welding and includes a pair of platens positioned facing each other in a fastening-separating relationship which are provided on a resistance welding device and are respectively equipped with a movable upper electrode and a fixed lower electrode. Each platen further includes a shank detachably connected to the upper electrode on one platen, and a shank holder separably fastened to the fixed electrode on the other platen. The shank holder integrally supports the shank in a relatively displaceable state such that the shank will move in accordance with the fastening and separating motions of the platens, whereby both electrodes are positioned by use of the shank and the shank holder for use during welding.

The present invention enables the desired electrodes to be loaded or changed in a resistance welder without the extra need for adjusting the position of each electrode, by merely loading or detaching a shank and a shank holder from its corresponding platen. The shank holder integrally supports the shank, thereby allowing the respective electrodes to be aligned in the correct positions. The present invention also enables a guide member on a movable side to be displaced utilizing force from the resistance welding device to drive a platen.

A preferred embodiment of the electrode unit includes a first guide member on the fixed side of the electrode unit for positioning a work to be loaded on the lower electrode and a second guide member on the movable side of the electrode unit for detaching the work after welding, by surrounding the work with said second guide member prior to nipping the work between the electrodes.

The present invention enables resistance welding to be carried out with the work surrounded by the guide members. Additionally, the movable electrode does not interfere with the guiding members because the electrodes are held in place by the shank and the shank holder.

A second aspect of the electrode unit comprises an interlocking mechanism which sequentially moves a guide member in cooperation with a shank.

In another aspect of the invention, the shank holder further comprises a set of water supply and drain pipes, with the shank holder having a channel connected with this piping for enabling cooling water to circulate therethrough. This aspect of the invention includes water supply and drain pipes which makes it possible to cool areas in the shank holder, by circulating cooling water through the cooling water channel, thereby allowing the lower electrode to be integrally housed therein.

According to the present invention, by mounting and detaching a shank and a shank holder from opposing platens, it becomes possible to change electrodes on a resistance welder without the need for making position adjustment. Therefore, when changing electrodes according to the differing characteristics of the work, quicker changeover is facilitated. According to the present invention, performing changes of electrodes is both easier and quicker. The present invention also permits the mechanical drive force of the resistance welding unit to be used to displace guide members, thereby making it unnecessary to provide additional driving mechanisms and lowering the cost of the welding unit. Further, with the present invention, a set of supply water inlet and outlet pipes allow cooling water to circulate within the electrode unit, which makes piping simpler and smaller, and improves workability. Additionally, by sectioning a channel in the fixed portion of the electrode unit, not in the movable portion of the electrode unit, the potential for water leakage is minimized. Moreover, periodic checking of the piping of such a system becomes unnecessary.

This invention relates to an electrode unit for resistance welding that includes a pair of platens facing each other. Upper and lower electrodes are attached to the platens such that a shank detachably connects the movable electrode with the first platen, and a shank holder separately fastens the fixed electrode with the second platen. The shank holder integrally supports the shank in a displaceable position, where the shank is moved in accordance with the upward and downward movement of the first platen, and where the electrodes are positioned by use of the shank and the shank holder.

According to another aspect of the invention, the shank holder includes a set of water supply and drain pipes, and a channel connected therebetween that enables cooling water to circulate throughout.

According to another aspect of the invention, the shank holder further includes a fastened side and a moveable side, such that a first guide member on the fastened side positions a work to be loaded on the lower electrode. A second guide member on the movable side separates the work after welding by surrounding the work with the first guide member on the fastened side, before the upper electrode engages the work with the lower electrode.

According to another aspect of the invention, the electrode unit further includes an interlocking mechanism, such that the interlocking mechanism enables the guide member on the movable side to operate in conjunction with the shank. The interlocking mechanism includes a link arm having a cam groove, a connecting member affixed to the shank, a cam roller attached to the connecting member and positioned in the cam groove of the link arm, and a connecting link connected to the link arm and movably attached to the first guide member.

According to another aspect of the invention, the electrode unit includes a base plate connected to the shank holder and detachably fastened to the second platen. The base plate may include a bolt having a head with a flange, wherein the bolt head is mated with a concave shaped groove in the second platen for connecting the base plate with the second platen. Alternatively, the second platen may have a guide block and a stopper block attached thereto, such that the base plate of the electrode unit is detachably guided onto the second platen.

BRIEF DESCRIPTION OF THE DRAWINGS

The present invention is further explained in the description which follows with reference to the drawings, illustrating, by way of non-limiting examples, various embodiments of the invention, with like reference representing similar pairs, and wherein:

FIG. 2A is a front view of the electrode unit of FIG. 1;

FIG. 2B is a side view of the electrode unit of FIG. 1;

FIG. 3A is a side perspective view of the shank holder of FIG. 1;

FIG. 3B is a rear elevation view of the shank holder of FIG. 1;

FIG. 3C is a bottom section view of the shank holder of FIG. 1; and

DETAILED DESCRIPTION OF THE PREFERRED EMBODIMENTS

Figure 1:
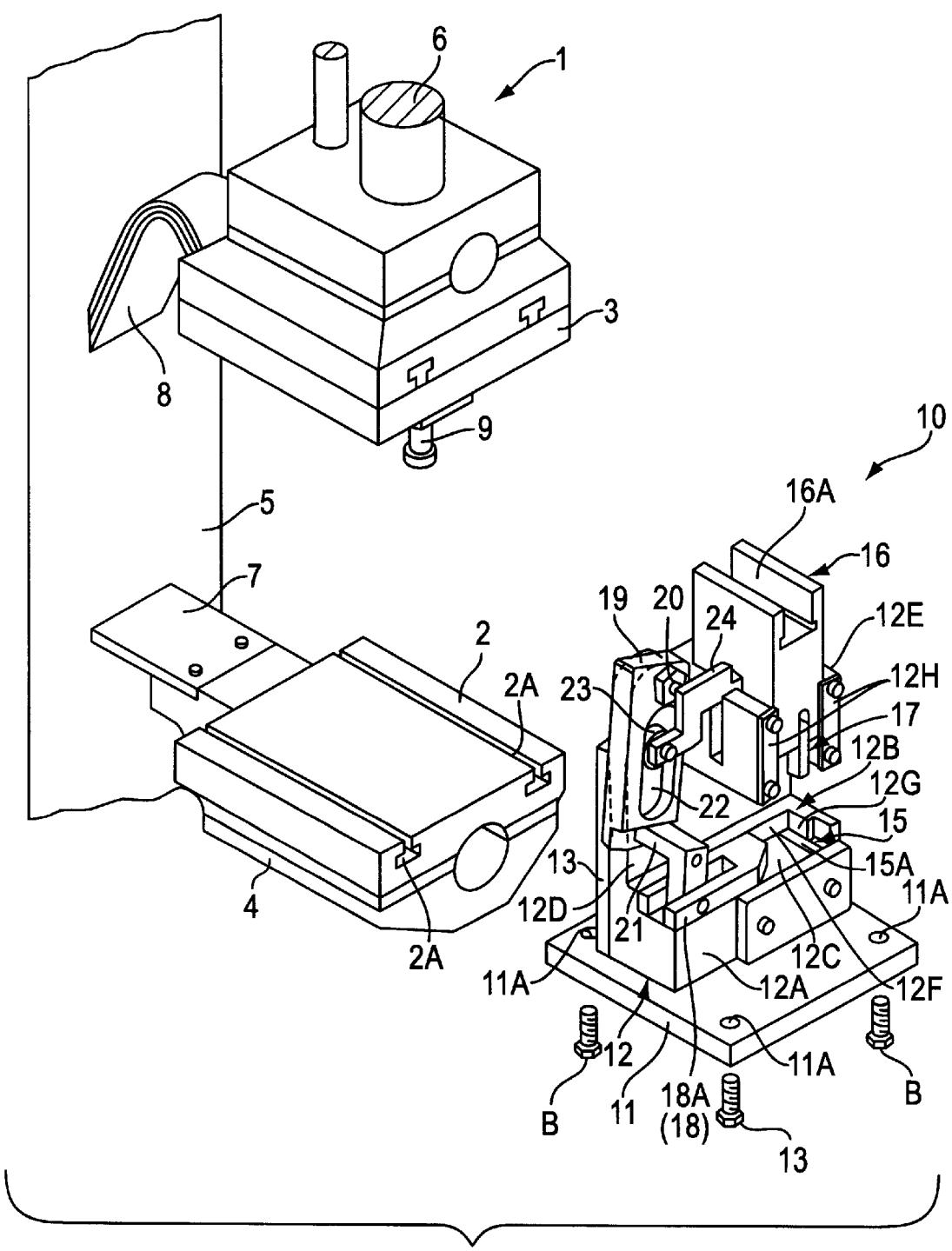
FIG. 1 is a perspective view of one embodiment of the present invention.

FIG. 1 is a perspective view of one embodiment of the present invention. As shown in the drawing, an aspect of this embodiment is a provision for an electrode unit 10 having a detachably integrated structure.

In FIG. 1, platens 2 and 3 of resistance welder 1 are conductive members of nearly square shape, and are arranged in an opposing upward and downward relationship with one another. Platen 2 is fixedly mounted to body frame 5 of resistance welder 1 via supporting member 4. Platen 3 is secured to body frame 5 via flexible conductive member 8, and is detachably mounted to press device 6 (only the rod of which is shown in FIG. 1) of the resistance welder. Platen 3 thereby is movable upwardly and downwardly. Conductive members 7 and 8 are connected with platens 2 and 3, respectively, which are connected with an electric circuit (not shown) provided in body frame 5.

FIG. 2A is a front perspective view and FIG. 2B is a side perspective view of electrode unit 10 of the embodiment depicted in FIG. 1. As shown in FIGS. 2A and 2B, electrode unit 10 of the present invention provides for integral welding of the stripped ends of bundled coiled wires. Electrode unit 10 is equipped with a base plate 11 connected with platen 2. Base plate 11 is detachably and electrically conductively fastened to platen 2 with insertion holes 11A formed in the four corners of base plate 11, having bolts B inserted therethrough. Platen 2 has two nearly concave shaped or T-shaped grooves 2A running fore and aft, such that the heads of bolts B can be inserted thereinto and are movable within a limited range. The nuts of bolt B are not shown in FIG. 1, but are screw fitted therewith from the upper side of base plate 11. Base plate 11 is formed of a material with high conductivity such as chrome copper. Base plate 11 is fastened with shank holder 12 by small screws (not shown).

FIG. 3A is a side view, FIG. 3B is a rear elevation view, and FIG. 3C is a bottom view of the shank holder of the electrode unit depicted in the embodiment of FIG. 1. With references to FIGS. 3A–3C, shank holder 12 is formed of a material of high electrical resistance such as cast iron (for instance, nodular graphite cast iron; JIS-FCD-45). With the embodiment shown in the drawing, the interior of shank holder 12 contains a channel 121 covered by back plate 13, such that cooling water circulates through a set of pipes 14 mounted on back plate 13. Pipe set 14 enables water supply and drainage, and includes a water supply inlet on one end and a water drain outlet on the other end. In addition, channel 121 contains sections to permit the circulation of cooling water to cool the necessary areas of shank holder 12, which is integrated with electrodes 15 and 17 and is later described. In this respect, because holders of a pair of electrodes have heretofore been separated, it has been necessary to section the channel which circulates cooling water from a plurality of water supply and drain pipes to obtain the needed cooling effect. In such arrangements, various problems have been encountered, such as complicated forms of piping, decreases in workability, larger applicator sizes, regular repair and replacement of piping, etc. In addition, as piping has been required in working areas, such structures have been susceptible to water leakage.

As shown in FIGS. 1, 2A and 2B, shank holder 12 includes guide block 12A which is mounted on base plate 11. Guide block 12A is formed of a substantially square shape which extends left and right from a side perspective view, on the upper surface of which is positioned the lower front end of step 12B. The upper surface 15A of the fixed electrode 15 is integral with surface 12C at the bottom of step 12B, and is electrically conductively connected with base plate 11.

Shank holder 12 is equipped with shank guide 12E and connected with guide block 12A through plate area 12D. Shank guide 12E is block-shaped with a vertical channel as viewed from above, allowing shank 16 to move upwardly and downwardly against surface 15A of lower electrode 15. Shank 16 is composed of a material with high conductivity such as chrome copper, and its upper end contains a concave shaped or T-shaped groove 16A running fore and aft. Groove 16A is mated with rod 9 having a flange for connecting with platen 3. Groove 16A allows rod 9 to be inserted in a forward and aft direction, and shank 16 is structurally integral to, and electrically conductive with, platen 3. Movable upper electrode 17 is fastened to the lower end of shank 16, and it applies voltage to the work in collaboration with fixed electrode 15. Upper electrode 17 is electrically conductively connected with platen 3 through shank 16. In FIGS. 1, 2A and 2B, 12H is a front guide plate which controls shank 16 for passing through shank guide 12E in the upward and downward directions.

As shown in FIGS. 1 and 2A, lower electrode 15 is integrally mounted to guide block 12A on shank holder 12, while upper electrode 17 is integrally fastened to shank 16, the position of which is guided by the shank holder. Therefore, the position of electrodes 15 and 17 in the fore and aft directions and in the right and left directions are precisely controlled. Moreover, with the embodiment shown in the drawings, by merely mounting electrodes 15 and 17 onto platens 2 and 3 by use of shank holder 12 and shank 16, the alignment of the electrodes of a resistance welder is made possible without any need for position adjustment.

The structure for positioning a wire (not shown) on lower fixed electrode 15 is next described. First, electrode 15 has a rectangular surface area 15A running in the forward and aft directions, when viewed from the front. Exposed electrode surface 15A is flush with the surface 12C of guide block 12A, and two portions of surface 15A are positioned at right angles to edges 12F and 12G of guide member 12B. Edges 12F and 12G of guide member 12B cooperate to position the wire against fixed electrode 15 in the embodiment depicted in the drawing. Edge 12F, which extends in a direction perpendicular to electrode surface 15A, also guides guide member 18 on a movable path along surface 12C. Guide member 18 is positioned in opposing relationship to end face 12G, and is movable fore and aft in a direction perpendicular to electrode surface 15A.

In order to facilitate movement of guide member 18 in the left and right directions relative to plate area 12D of the shank holder, the upper end of link arm 19 is supported by rotating pin 20, and the lower end of link arm 19 is connected with fork-shaped end 18A of guide member 18 via connecting link 21. Link arm 19 has a cam groove 22 with longitudinally extending guide edges, and cam roller 23 is slidably coupled for longitudinal movement in cam groove 22. Cam roller 23 is fastened to shank 16 via connecting member 24 such that when shank 16 is at its upper position (when welding is not being performed), cam roller 23 is positioned at the top of cam groove 22 and guide member 18 is displaced away from end face 12G of guide member 12. As shown in FIG. 2A, downward movement of shank 16 during welding causes link arm 19 to rotate about pin 20 such that link arm 19 is moves in a counterclockwise direction as depicted in FIG. 2A, thereby enabling guide member 18 to nip the cable or wire between its end face and end face 12G, as the cable or wire is positioned between electrodes 15 and 17.

With the structure described above, electrode unit 10 can be mounted on resistance welder 1 such that electrodes 15 and 17 can be accurately aligned without the need of adjusting the positions of the electrodes, by fastening base plate 11 to platen 2 and by connecting shank 16 to platen 3.

During operation, press device 6 of resistance welder 1 is driven by a foot switch (not shown here), and the cable is nipped between electrodes 15 and 17 as platen 3 is lowered toward platen 2 and power is applied for predetermined time while resistance welding is carried out. After guide member 18 encloses a cable between end faces 12F and 12G, resistance welding is carried out with upper electrode 17 and lower electrode 15 nipping the cable between them, thereby securely positioning the cable between the electrodes and allowing for a favorable welding area.

With the embodiment described above, by providing a plurality of units 10 according to the kinds of cables to be welded, the mounting and changing of the desired electrodes on the resistance welder can be made possible without the need for position adjustment of respective electrodes 15 and 17, by only detaching a shank 16 and a shank holder 12 from platens 2 and 3. Consequently, even where electrodes 15 and 17 are changed according to the work to be welded, adjusting the positions of both electrodes becomes unnecessary, resulting in faster changeover. Therefore, according to the above-noted embodiment, the remarkable effects of easy and fast electrode changeover can be attained.

Because press device 6 of resistance welder 1 provides motive force to displace guide member 18, the provision of another driving mechanism for guide member 18 is unnecessary, thereby providing the advantage of lower cost of manufacturing. In addition, since cooling water is circulated by water supply and drainage pipes 14, and thus allows for cooling where needed, the advantages of simple piping, higher workability and smaller size of electrode unit, etc. can be attained. Moreover, since channel 121 and water supply and drainage pipes 14 are provided on shank holder 12, which is a non-moving member, the potential for water leakage is minimized.

Figure 4:
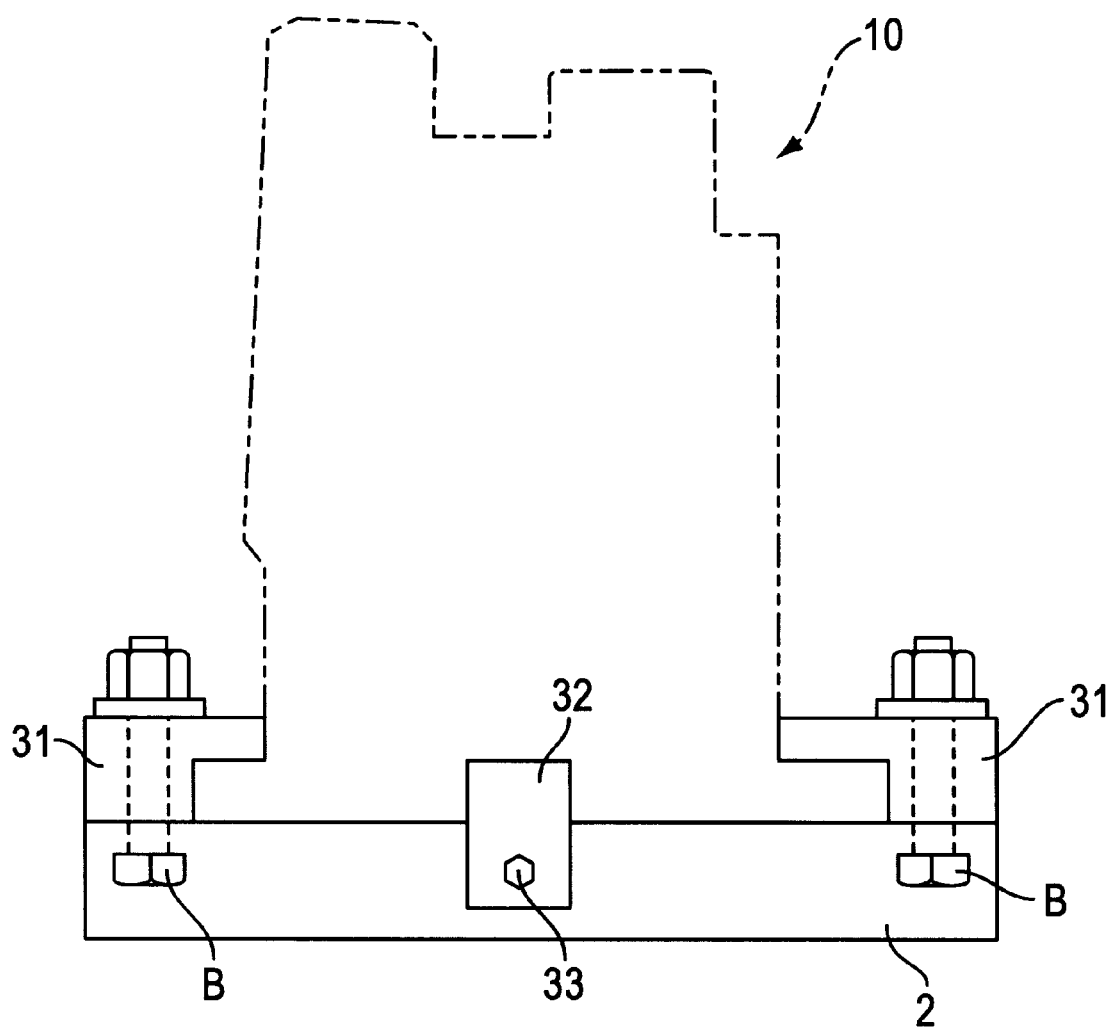
FIG. 4 is a schematic representation of another aspect of the present invention.

The embodiment described above is a mere example of the preferred embodiment of the present invention, which is not limited in scope to such embodiment. For instance, as depicted in FIG. 4 another aspect of the teachings of the current invention is provided. FIG. 4 is a schematic elevation view showing the essential parts of a modified example of the present invention. In the drawing, a pair of guide blocks 31 and a stopper member 32 are provided on platen 2. Guide blocks 31 detachably guide the electrode unit only in the forward and aft directions. Likewise, stopper 32, which is attached to bolt 33, limits movement in the forward and aft directions. Therefore, by rotating stopper member 32 by loosening bolt 33, and then by releasing electrode unit 10, electrode unit 10 can be withdrawn forward and removed from the resistance welding device. Conversely, electrode unit 10 can be loaded onto platen 2 and fastened securely thereon with stopper member 32.

Additionally, various design alterations also can be carried out within the scope of the claims of the present invention.

The present disclosure relates to subject matter contained in Japanese Application No. HEI 8-208479, filed on Aug. 7, 1996, which is expressly incorporated herein by reference in its entirety.

What is claimed:

1. An electrode unit for resistance welding, comprising:
    a pair of platens that faces each other, an upper electrode and a lower electrode being attached to said pair of platens;
    a shank that detachably connects said upper electrode with a first platen of said pair of platens; and
    a shank holder that separately fastens said lower electrode with a second platen of said pair of platens, wherein said shank holder integrally supports said shank in a displaceable position, said shank being moved in accordance with an upward movement and a downward movement of said first platen, and
    wherein said lower electrode and said upper electrode are positioned by use of said shank and said shank holder.

2. An electrode unit for resistance welding as recited in claim 1, wherein the shank holder further comprises a set of water supply and drain pipes, and a channel connected therebetween enabling cooling water to circulate throughout.

3. An electrode unit for resistance welding as recited in claim 1, wherein the first platen has a lower end with a rod having a flange, wherein the shank has an upper end with a concave groove, and wherein the rod is mated with the groove for connecting the first platen to the upper electrode.

4. An electrode unit for resistance welding as recited in claim 3, wherein the concave groove of the shank is "T"-shaped.

5. An electrode unit for resistance welding as recited in claim 1, further comprising;
   a base plate connected to the shank holder; and
   wherein the base plate is detachably fastened to the second platen.

6. An electrode unit for resistance welding as recited in claim 5, wherein the base plate is electrically conductively fastened to the second platen.

7. An electrode unit for resistance welding as recited in claim 5, wherein the base plate is formed of a material of high electrical conductivity.

8. An electrode unit for resistance welding as recited in claim 5, wherein the base plate further comprises a bolt attached to the base plate, and wherein the bolt has a head with a flange, and wherein the bolt head is mated with the groove of the second platen for connecting the base plate with the second platen.

9. An electrode unit for resistance welding as recited in claim 8, wherein the concave groove of the second platen is "T"-shaped.

10. An electrode unit for resistance welding as recited in claim 5, wherein the second platen further comprises:
    a guide block attached to the second platen; and
    a stopper member attached to the second platen.

11. An electrode unit for resistance welding as recited in claim 10, wherein the guide block detachably guides the base plate onto the second platen.

12. An electrode unit for resistance welding, comprising:
    a pair of platens that faces each other, an upper electrode and a lower electrode being attached to said pair of platens;
    a shank that detachably connects said upper electrode with a first platen of said pair of platens; and
    a shank holder that separately fastens said lower electrode with a second platen of said pair of platens, wherein said shank holder integrally supports said shank in a displaceable position, said shank being moved in accordance with an upward movement and a downward movement of said first platen, said lower electrode and said upper electrode being positioned by use of said shank and said shank holder, said shank holder comprising:
       a fastened side and a movable side; and
       a first guide member on said fastened side that positions a work to be loaded on said lower electrode, and a second guide member on said movable side that separates the work after welding by surrounding the work with said first guide member on said fastened side before said upper electrode engages the work with said lower electrode.

13. An electrode unit for resistance welding as recited in claim 12, further comprising an interlocking mechanism, wherein the interlocking mechanism enables the guide member on the movable side to operate in conjunction with the shank.

14. An electrode unit for resistance welding as recited in claim 13, wherein the interlocking mechanism further comprises:
    a link arm having a cam groove;
    a connecting member having a first end and a second end, wherein the first end of the connecting member is affixed to the shank;
    a cam roller, wherein the cam roller is attached to the second end of the connecting member and wherein the roller is positioned in the cam groove of the link arm; and
    a connecting link, wherein the connecting link is connected to the link arm, and wherein the first guide member is movably attached to the connecting link.

15. An electrode unit for resistance welding as recited in claim 14, wherein the first guide member has a fork-shaped end movably attached to the connecting link.

16. An electrode unit for resistance welding as recited in claim 14, wherein the first guide member moves horizontally toward the work during resistance welding operations.

17. An electrode unit for resistance welding as recited in claim 12, wherein the second guide member comprises a shank guide having a channel that permits vertical movement of the shank.

18. An electrode unit for resistance welding as recited in claim 17, wherein the channel of the shank guide is block-shaped.

19. An electrode unit for resistance welding as recited in claim 17, wherein the shank guide is formed of a material of high electrical resistance.

20. An electrode unit for resistance welding as recited in claim 17, wherein the shank guide is fixedly mounted to the shank holder.

21. An electrode unit for resistance welding, comprising:
    a first platen;
    a second platen;
    an upper electrode;
    a lower electrode;
    a shank that detachably connects said upper electrode with said first platen;
    a shank holder that selectively fastens said lower electrode with said second platen, said shank holder comprising:
       a fastened side;
       a movable side;
       a first guide member on said fastened side that positions a work to be loaded on said lower electrode; and
       a second guide member on said movable side that separates the work after welding, by surrounding the work with said first guide member on said fastened side before said upper electrode engages the work with said lower electrode.

* * * * *